United States Patent [19]

Austin

[11] 4,092,511

[45] May 30, 1978

[54] WORK COIL FOR USE IN AN INDUCTION COOKING APPLIANCE

[75] Inventor: Buddy Julian Austin, Lafayette, Ind.

[73] Assignee: Roper Corporation, Kankakee, Ill.

[21] Appl. No.: 756,059

[22] Filed: Jan. 3, 1977

Related U.S. Application Data

[62] Division of Ser. No. 518,773, Oct. 29, 1974, Pat. No. 4,029,926.

[51] Int. Cl.² .............................................. H05B 9/02
[52] U.S. Cl. .......................... 219/10.49 R; 219/10.79
[58] Field of Search ............... 336/84, 205, 223, 232, 336/60; 219/10.49, 10.79

[56] References Cited

U.S. PATENT DOCUMENTS

| | | | |
|---|---|---|---|
| 1,342,304 | 6/1920 | Steinberger et al. | 336/205 |
| 1,342,306 | 6/1920 | Steinberger et al. | 336/205 |
| 1,342,309 | 6/1920 | Steinberger et al. | 336/205 |
| 1,432,800 | 10/1922 | Steinberger et al. | 336/205 |
| 1,555,954 | 10/1925 | Steinberger et al. | 336/223 X |
| 3,081,989 | 3/1963 | McBrien | 336/223 X |
| 3,275,784 | 9/1966 | Merrett | 219/10.79 |
| 3,697,716 | 10/1972 | Kornrumpf | 219/10.79 |
| 3,710,062 | 1/1973 | Peters, Jr. | 219/10.49 |
| 3,781,503 | 12/1973 | Harnden, Jr. et al. | 219/10.79 X |
| 3,843,857 | 10/1974 | Cunningham | 219/10.49 |

*Primary Examiner*—Thomas J. Kozma

*Attorney, Agent, or Firm*—Leydig, Voit, Osann, Mayer & Holt, Ltd.

[57] ABSTRACT

An induction cooking appliance for operation at ultrasonic frequencies and including an improved work coil coupled in a solid state inverter circuit to generate an ultrasonic frequency magnetic field which is coupled to a metallic utensil through a non-electrically conductive cooktop. Coil losses are minimized, and coupling efficiency increased by forming the coil of solid conductor wound in a loose spiral, with the pitch of the spiral being related to the radial thickness of the conductor by a factor falling within a predetermined range. The loosely wound coil is held in a grooved dielectric support which insures proper turn spacing for the life of the appliance and which is immune to high temperatures which may be developed during operation of the coil. Means are provided under the support to minimize stray radiation and limit inductance variations which might otherwise result from nearby metallic members. Means are provided for holding the coil adjacent the underside of the cooktop for optimum coupling and to utilize heat developed in the coil. The loosely wound configuration is advantageously fabricated by methods including interleaving the coil conductor with an insulative strip. Alternatively, an open coil may be formed by winding the conductor on a frusto-conical mandrel whose degree of taper is related to the desired pitch of the coil, and compressing the coil into a planar configuration.

7 Claims, 10 Drawing Figures

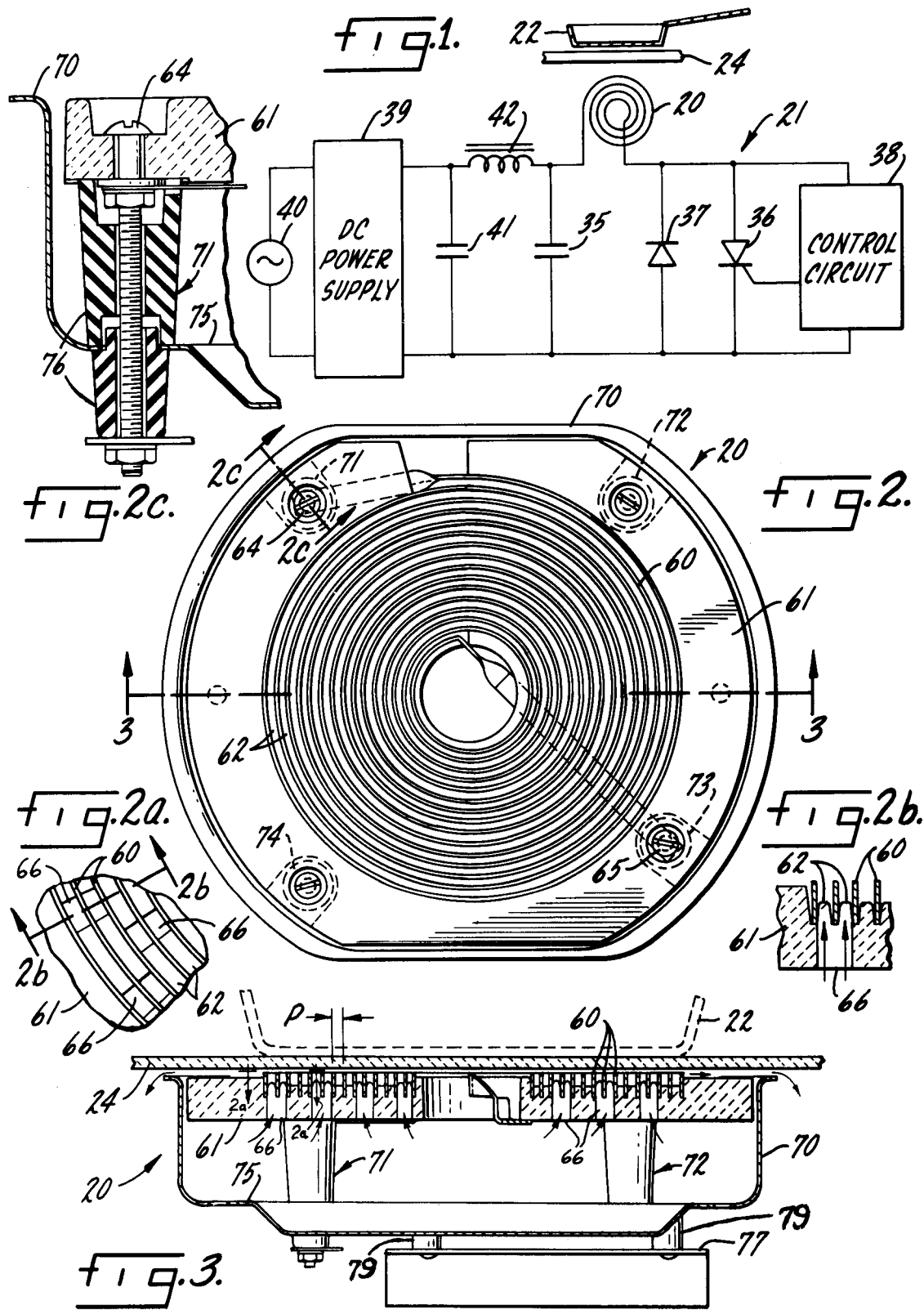

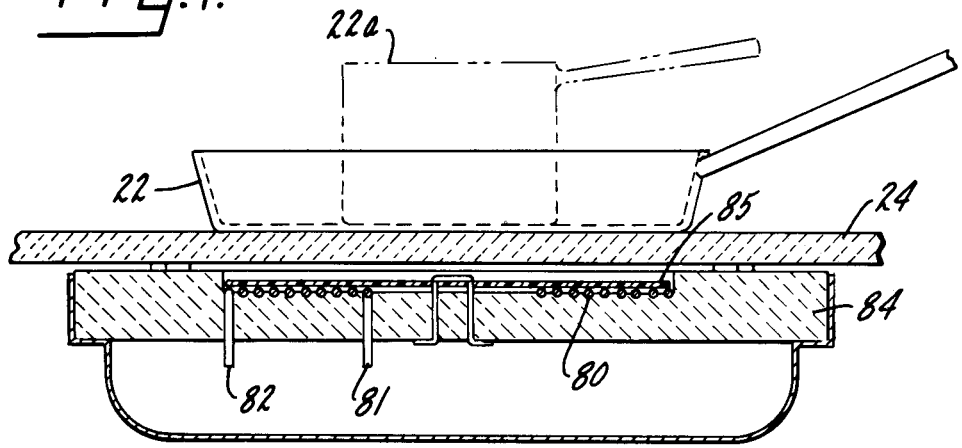
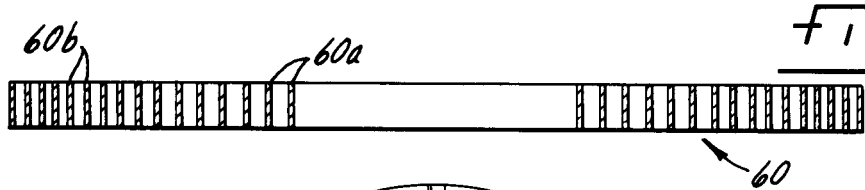
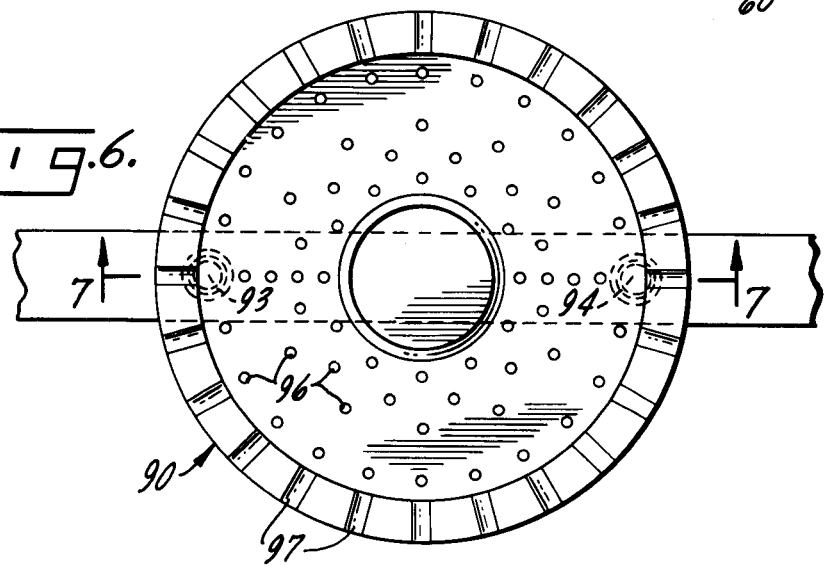
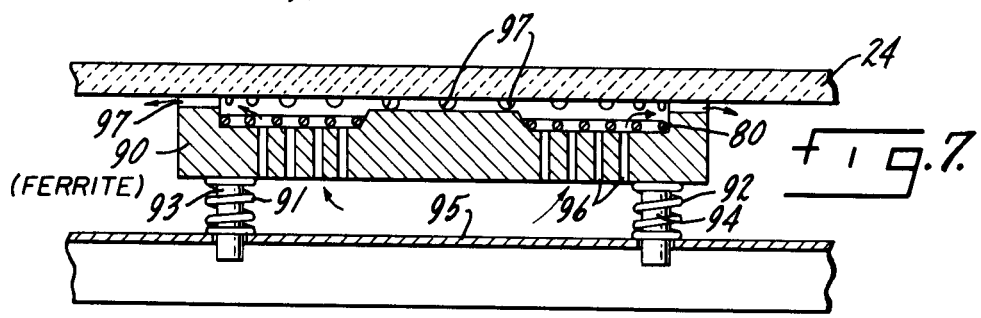

WORK COIL FOR USE IN AN INDUCTION COOKING APPLIANCE

This is a division of application Ser. No. 518,773, filed Oct. 29, 1974, now U.S. Pat. No. 4,029,926.

This invention relates to induction cooking appliances, and more specifically to an improved work coil for use in such appliances.

Cooking appliances utilizing solid state inverters operated at ultrasonic frequencies for producing an alternating magnetic field capable of generating heat in a metallic utensil are known. The inverter circuits most commonly found in these appliances generally include an SCR, an inversely poled parallel diode, a work coil and a commutating capacitor. Triggering of the SCR initiates a bidirectional resonant exchange of energy between the capacitor and coil followed by a recharge period before the SCR is again triggered.

Such appliances possess several advantages not available in other known cooking appliances. Conventional gas and electric burners, which generate their heat remotely from the food, must operate at a temperature many hundreds of degrees hotter than the food being heated. In induction cooking, since heat is generated directly in the utensil and applied directly to the food, there is no need for high temperatures, and, as a result, the cooktop remains relatively cool, and spilled foods cannot burn or char, and the amount of waste heat given off to the kitchen is minimized. Finally, induction cooking systems are characterized by low thermal mass, allowing quick response to changes in heat settings.

A major disadvantage associated with presently known induction cooking appliances, as described in prior patents, is their relative complexity and high manufacturing cost. A major element of cost is the work coil. It will be appreciated that the design of a work coil is complicated by the need to satisfy several operational requirements: (a) sufficient inductance for resonance in the inverter circuit; (b) sufficient range of power drawn from the inverter; (c) physical size limitations; (d) high coupling efficiency; (e) high RMS current carrying capacity at the ultrasonic operating frequency; (f) extremely low a.c. resistance at such frequency; and, (g) insulation capable of withstanding the high temperature which may be developed in the coil under certain conditions.

Presently known surface heating induction cooking appliances have taken different approaches with regard to the construction of a suitable work coil. A first technique contemplates the provision of a thin strip-like conductor of rectangular cross section wound in a spiral interleaved with a thin insulating strip. In order to provide a coil capable of generating sufficient flux while still meeting the limitation on overall size, those using this approach generally suggest that the coil should be tightly wound. While coils of this nature may be manufactured in a relatively economical manner, they achieve this economy at the expense of increased a.c. resistance and decreased coupling efficiency. As a result, mechanical cooling is often required to dissipate the heat generated within the coil caused by the increased $I^2R$ losses.

In order to avoid the problems noted above, other known cooking appliances have utilized work coils wound of Litz wire. While Litz wire decreases the a.c. resistance of the coil and increases its coupling efficiency, it is relatively expensive and therefore significantly increases the cost of the appliance. As such coils are also generally tightly wound, heat generation may become a problem, and certain known appliances utilizing Litz wire coils require mechanical cooling to keep temperatures within the limits of conventional insulation.

With the foregoing in mind, it is a general aim of the present invention to provide a work coil for use with an induction cooking appliance which is both economical to manufacture and efficient to operate. In accomplishing that aim, it is an object of the present invention to provide a work coil formed of a single solid conductor, and having a geometry adapted to minimize a.c. resistance. In that regard, it is an even more specific object to provide a work coil having a geometry wherein skin effect losses and proximity losses are in predetermined relation.

According to another aspect of the invention, it is an object to provide a work coil for use in an induction cooking appliance formed of a solid conductor loosely wound in a spiral configuration, and having an improved coil support which accurately maintains the spacing between adjacent turns of the coil. It is a related object to provide a coil support having improved shielding means which allows the coil to be supported by a metallic member of the appliance, while minimizing inductance variations and losses which might result from proximity with such metallic support.

A general object of the present invention is to provide a work coil for use in an induction cooking appliance wherein the need for mechanical cooling is eliminated by minimizing coil losses and maximizing convective air flow around the coil conductor. It is an additional object to provide a coil assembly which is immune to the high operating temperatures which may be developed under both normal and abnormal conditions, thereby to enhance reliability and reduce need for service.

Other objects and advantages will become apparent from the following detailed description, taken in conjunction with the drawings, in which:

FIG. 1 is a schematic electrical diagram of an induction cooking appliance embodying the present invention;

FIG. 2 is a plan view of a work coil constructed in accordance with the present invention;

FIG. 2a is an enlarged fragment of FIG. 2 showing air openings;

FIG. 2b is a fragmentary section taken along line 2b—2b in FIG. 2a;

FIG. 2c is a fragmentary section taken along line 2c—2c in FIG. 2;

FIG. 3 is a sectional view taken generally along the lines 3—3 of FIG. 2, but including the cooktop and a mounting channel within the appliance;

FIG. 4 is a view similar to FIG. 3 but showing use of a solid conductor of round cross section;

FIG. 5 is a partial sectional view of a coiled conductor similar to that shown in FIG. 3, but illustrating the preferred variable pitch coil;

FIG. 6 is a plan view showing an alternative embodiment of work coil support with the conductive coil omitted for clarity;

FIG. 7 is a sectional view taken generally along the lines 7—7 of FIG. 6.

While the invention will be described in connection with certain preferred embodiments, it will be understood that there is no intent to limit it to such embodiments; but, on the contrary, the intent is to cover all alternatives, modifications and equivalents included within the spirit and scope of the invention as defined by the appended claims.

Turning now to the drawings, and particularly to FIG. 1, there is shown the circuitry of an induction cooking appliance including a work coil constructed in accordance with the present invention. It should be noted, however, that the work coil may be utilized in various inverter configurations, the illustrated circuitry being merely exemplary of such inverters.

As shown in FIG. 1, the work coil 20 is coupled in an inverter circuit generally indicated at 21 for producing heat in a metallic utensil 22. The utensil is supported on a smooth, substantially non-metallic cooktop diagrammatically illustrated at 24. The inverter circuit further includes a commutating capacitor 35 and a gate controlled thyristor shown herein as a power SCR 36 with an inversely poled parallel diode 37. A control circuit 38 is provided for gating the SCR at the ultrasonic operating frequency of the inverter. As shown, the control circuit is also coupled to the anode of the SCR, and may be provided with circuitry for sensing conditions within the inverter circuit to modify circuit operation in order to maintain conditions within the ratings of the semiconductor elements.

For supplying an energizing d.c. potential to the inverter, a d.c. power supply 39 is driven from an alternating current source of power 40, which is typically a 120 volt, 60 Hz. supply. A capacitor 41 is coupled across the output of the d.c. supply for reducing ripple, and a smoothing inductor 42 is connected between the filter capacitor and the commutating capacitor for providing a relatively constant charging current to the inverter. Various means are available for adjusting the heating levels of the inverter "burner", including varying the output voltage of the d.c. supply 39, and varying the frequency and/or duty cycle of the SCR gate pulses produced by control circuit 38. Suitable circuitry is shown in my copending U.S. applications Ser. No. 513,635 filed Oct. 10, 1974, now abandoned and Ser. No. 518,772 filed Oct. 29, 1974 now U.S. Pat. No. 4,010,342.

A cycle of inverter operation will now be described, assuming the system is stabilized and capacitor 41 is charged to the level of the d.c. supply. Current flow from capacitor 41 through the smoothing inductor 42 causes the commutating capacitor 35 to charge positively. A gate pulse supplied to the gate of the SCR 36 by the control circuit 38 causes the SCR to conduct, discharging capacitor 35 through the work coil 20 and the anode-cathode circuit of SCR 36. The discharge of capacitor 35 serves to increase the current flow in the work coil, causing continued conduction to charge capacitor 35 negatively. When the energy in the work coil is dissipated, the capacitor will begin to discharge in the opposite direction through the diode 37, causing a reverse current pulse in the work coil. During this period, the SCR is commutated to resume its blocking state. Just as in the previous half cycle, the current through the work coil causes current flow to continue after capacitor 35 is discharged. Accordingly, the capacitor recharges in a positive direction. When current flow again ceases, the capacitor will attempt to discharge, but is prevented from doing so as SCR 36 has again resumed its blocking state. Current flow through the smoothing inductor 42 recharges capacitor 35 before the next gate pulse is supplied to the SCR to initiate another conductive cycle.

When conducting the resonant current pulses as described above, the work coil 20 acts as a primary winding generating an ultrasonic frequency magnetic field. The utensil 22 is aligned over the work coil so that the ultrasonic frequency magnetic field is coupled to the utensil which serves as a single-turn shorted secondary, to be heated by the energy contained in the field. It will, therefore, be appreciated that the work coil 20 must be configured to couple the maximum amount of energy to the utensil 22 in order to increase efficiency and to achieve high power cooking. Additionally, coil losses must be minimized so that currents sufficient to generate the aforementioned high power cooking levels may be passed through the work coil without causing the coil to overheat. It is noted that work coil r.m.s. currents of 50–60 amperes or more at the ultrasonic operating frequency are not uncommon. A further significant increase in economy may be achieved if the coil temperature may be maintained within the necessary limits without the need for mechanical cooling, temperature limiting thermostats or costly types of insulating materials.

Turning now to FIGS. 2 and 3, there is shown a preferred embodiment of a work coil 20 constructed in accordance with the present invention. The coil includes a conductive member 60 which, in accordance with the invention, is a solid single strand conductor preferably of copper wound in a loose spiral configuration. While the particular geometry for the coil will be described in detail below, it is noted that the drawing illustrates a coil having a radial thickness-to-pitch ratio of approximately 0.2.

For supporting the coil and accurately maintaining the spacing between adjacent turns, a dielectric support member 61, spirally grooved to define ridges indicated at 62, is provided for receiving the conductive strip 60. The conductor is rectangular in cross section, with the longer dimension of the rectangle being generally perpendicular to the dielectric support 61, and closely fitted into the spiral groove to establish the desired winding pitch. While the dielectric support 61 may be fabricated using various materials and processes, it is presently preferred to mold the support member of an asbestos cement such as that sold by the Rostone Corp. under the trademark "Rosite". If desired, the conductor may be molded in situ.

For providing a convenient means of electrically connecting the coiled conductor 60 into the inverter circuit, the ends of the conductor may be downwardly bent and anchored to respective terminal bolts 64, 65.

As illustrated in FIGS. 2a and 2b, apertures 66 allow the passage of air between the turns of the coil, thereby to allow the coil to be convectively cooled. The overall assembly is arranged so that the conductive coil is mounted as close as possible to the cooktop, while still providing a small gap between the coil and cooktop to allow for the passage of air, and to minimize back heating from the utensil to the coil.

A further advantage of the construction is the immunity to high temperature which may be developed in the coil. Work coils known heretofore have been limited in their ability to operate at elevated temperatures by the characteristics of the insulating material used. Litz wire coils, for example, being wound of braided wire, the individual strands of which are coated with enamel or the like has a limiting operating temperature of about 400° F. To prevent the power losses within the coil from driving the temperature beyond such limit, mechanical cooling must be provided. By way of contrast the maximum operating temperature of the work coil illustrated in FIGS. 2 and 3 is limited only by the heat-resistant characteristics of the supporting means. Comparatively inexpensive molded materials such as ceramics or the aforementioned "Rosite" readily withstand operating temperatures as high as 1000° F.

For preventing unwanted radiation from the coil, and minimizing variations in coil inductance which might be caused by proximate metallic members, a highly conductive shield, shown herein as cup-like member 70 mounts the support member 61, and encloses the area below the coiled conductor 60. The cup-like member is preferably made of aluminum or other highly conductive metal adapted to draw only a minimal amount of energy from the magnetic field, thereby to reduce losses. The support member 61 is, in the present instance, supported within the cup 70 upon four pedestals 71-74 which seat on a ledge 75. By way of example, it includes, in addition to terminal bolt 64, an insulating spacer assembly 76 which is telescoped over the bolt. The coil-support-shield assembly is supported on a mounting channel 77 within the appliance by mounting posts 79. The mounting posts may comprise fixed spacers as illustrated in FIG. 3, or alternatively may comprise a spring urged assembly as illustrated in FIG. 7, adapted to maintain a known coil to cooktop spacing irrespective of dimensional tolerances of the coil and mounting channel.

Power loss and decrease in coil inductance caused by the shield are reduced by maintaining a spacing of at least one half inch between the coil and shield. This is advantageous when constructing a coil to fit a plurality of appliances, because the shielding means prevents the heating of portions of the appliance, particularly ferrous elements, which might otherwise fall within the range of the magentic field. As shown in FIG. 3, the coil assembly 20 is mounted upon a channel member 77, a fixed metallic support within the appliance, which, without the shield, might be heated by the magnetic field, and draw significant energy therefrom. The aluminum cup 70 prevents the magnetic field radiated by the conductive coil 60 from radiating beyond the cup, with only minimal energy being drawn by the cup. In other words, the major portion of the energy produced by the coil is coupled to the metallic utensil disposed over the coil.

In order to efficiently couple the generated magnetic field to normally available cookware, the coil should be dimensioned so that it substantially conforms with the bulk of the cooking utensil. This not only assures maximum coupling, but additionally provides a relatively smooth distribution of heat in the utensil. FIGS. 3 and 4 illustrate a cooking utensil 22, simulating a 10-inch fry pan overlying the coil 20 and projecting slightly beyond the outer periphery of the coil. It is presently contemplated that a maximum coil size of about 9-inch diameter is most suitable, coupling efficiently to large utensils as illustrated, while nevertheless coupling sufficient energy to smaller utensils, such as the 1 quart saucepan illustrated in dotted lines at 22a. Additionally, an induction cooking appliance having multiple "burners" may be provided with "low power" work coils of smaller size for use with smaller utentils and one or more large "high power" work coils for use with large utensils. Efficient cooking can be achieved, and work coils having the necessary electrical characteristics can be constructed, in sizes ranging between 5 and 9 inches in diameter. As illustrated in the drawings, the work coils are provided with a central opening, which preferably falls in a range between 0.5 and 4 inches. One consideration in determining the size of such opening is to make the ID to OD ratio relatively small in order to make the coil inductance depend mainly upon the number of turns rather than the particular coil geometry.

Turning again to FIG. 4, there is seen an alternative coil configuration wherein the conductive coil is formed of a single strand conductor of round cross section, preferably of copper, wound in a spiral similar to that shown in FIGS. 2 and 3. Just as in the case of the conductor of rectangular cross section, the round conductor 80 is loosely wound and has electrical terminations at 81 and 82, for electrical connection of the coil into the inverter circuit. Of particular note is the dielectric support 84, which has a spirally ribbed coil supporting surface into which the round conductor is laid, being held in place by the dielectric cover plate 85. In other respects, the coil arrangement is similar to that described above, except for the geometry considerations which will now be set forth.

In accordance with an important aspect of the invention, the coils described above, both those using rectangular and round cross sectional conductors, are loosely wound in order to minimize losses and improve coupling to the metallic utensil. As noted, an important consideration in providing a coil for carrying high RMS currents at ultrasonic frequencies is the minimization of a.c. resistance by limiting losses resulting from proximity effect and skin effect. It was also noted that the usual approach when addressing this problem is to use Litz wire, which is designed to minimize skin effect losses, and which also allows relatively tight conductor spacing without significant losses due to proximity effect.

Although it will be apparent to one skilled in the art, it should be briefly noted that skin effect losses are due to the characteristic of high frequency current flow in a conductor wherein the current is concentrated in a thin skin at the periphery of the conductor. As a result, the a.c. resistance of the conductor increases with frequency and also with decreasing surface area.

Proximity effect losses, on the other hand, result from the interaction of the magnetic fields created by current flow in closely spaced conductors. When the conductors are carrying current in the same direction, as in the case of the illustrated coils, the interacting fields cause the current to concentrate on non-adjacent surfaces of the conductor, thereby in effect increasing its a.c. resistance.

As proximity effect losses and skin effect losses are additive in determining the a.c. resistance of the coil, and as sufficient turns must be provided within the limited coil diameter to achieve the necessary amount of inductance, it might initially appear that a solid wire coil would be incapable of performing well in the above described induction cooking appliance. However, through experiment and study, it has been discovered that there is a range of coil geometrics wherein the pitch of the coil winding (the distance between corresponding points of adjacent turns indicated at "P" on FIG. 3) may be related to the dimensions of the conductor to produce work coils having superior characteristics. In view of the foregoing, and in accordance with the invention, it has been found that the performance of a soild conductor coil is enhanced if losses resulting from proximity effect are properly balanced against those resulting from skin effect. In accomplishing the foregoing, the following considerations have been found to be important.

Considering both round and rectangular cross sectional conductors, it can be said that skin effect losses decrease as the cross sectional area of the conductor is increased. However, an upper limit on the size of the conductor is established by the limited coil size into which a sufficient number of turns must be wound to achieve the desired value of inductance. Balanced against these considerations are proximity effect losses which establish a limit on the minimum spacing between turns or the tightness of the coil winding.

Turning first to the case of solid conductors of round cross section, it has been discovered that in a coil configuration for operation at the intended ultrasonic frequency (such as 20 kHz) acceptable values of a.c. resistance may be achieved in a range of coils whose conductor diameter is related to the coil pitch by a ratio ranging from a maximum of 0.9 to a minimum of 0.3. With a radial thickness to pitch ratio greater than 0.9, proximity losses dominate and the a.c. resistance increases beyond acceptable levels. By way of contrast, when the coil is wound loosely, with a diameter to pitch ratio below 0.3, skin effect losses dominate (the conductor size must be minimized to achieve sufficient coil turns) and a.c. resistance is objectionable. However, between the minimum and maximum stated above, coils may be constructed having acceptable parameters for use in induction cooking. This relationship has been found to hold for conductors of round cross section having diameters in the range between 0.040 and 0.130 inches. Coils have been constructed as described above, having inductance magnitudes (unloaded) of 10 microhenries or more, and capable of drawing over 1200 watts, while limiting coil losses to 100 watts or less.

Turning to the case of solid conductors of rectangular or ribbon cross section, performance even superior to that noted above has been achieved. Coils wound of such solid conductor, with the smaller rectangular dimension (or conductor thickness) being radial with respect to the coil, have proven highly effective in induction cooking appliances when wound with a radial thickness to pitch ratio ranging between a maximum of 0.7 and a minimum of 0.1. The cross sectional dimensions of conductors yielding this performance are in a thickness range between 0.010 and 0.090 inches, and a "depth" range between 0.100 and 0.625 inches. Coils have been constructed as described above having unloaded inductances of 10 microhenries or more, and able to draw 2200 watts in the illustrated induction cooking appliance with coil losses of 150 watts or less.

As a further feature of the loosely wound coil, not only may the coil be wound as described above to minimize losses thereby decreasing power wasted within the coil itself, but increased coupling efficiency is achieved. In short, it has been found that coupling efficiency is inversely proportional to the unloaded resistance of the coil (the a.c. resistance), and accordingly minimizing of such resistance increases coupling efficiency. Indeed, coupling efficiencies ranging to 98% have been achieved utilizing the teachings of the present invention. It should also be noted that theoretically, the most efficient coil of the two described coil configurations is that using the round conductor. However, it has been found that coupling efficiency for the round conductor configuration decreases with increasing coil-to-utensil gap more rapidly than the efficiency of rectangular conductor coils. As a result, for the coil-to-utensil gap normally encountered in induction cooking appliances (as determined mainly by the thickness of the cooktop), it is generally preferable to utilize the rectangular conductor configuration, especially for the "high power" burner.

In addition to the relationships noted above with regard to coil geometry, it has been found that coupling efficiency can be increased, and coil losses further minimized by increasing the winding pitch near the center of the coil. Although this might initially seem to be an impractical way of achieving a low loss coil, since the conductor length of the inner turns is much less than that of the outer turns, it has been found that proximity losses dominate in the interior turns and coil losses are actually increased if those turns are wound too tightly. Accordingly, in practicing the invention, it is preferred to wind the inner turns, such as the first four or five turns of a 16-18 turn coil, with a relatively loose pitch near the lower end of the above noted ranges, while winding the remaining turns more tightly in order to secure the desired inductance. Such a configuration is illustrated in FIG. 5 where the inner turns 60a are more widely spaced than the remaining turns 60b. It is presently contemplated that the pitch of the central turns be at least twice the pitch of the peripheral turns, the change in winding pitch being made in a relatively steplike manner. In certain situations, however, it may be desirable to dispense with the stepwise increase in pitch, and progressively decrease the pitch (wind the coil tighter) as a function of the radius of the coil. While the pitch may be progressively decreased with each additional coil turn, since the main benefit of spacing is achieved near the coil center, it is preferred to use the wider or variable pitch for no more than the inner one-third of the turns, with the remaining turns being more closely spaced at a relatively constant pitch. While a rectangular conductor is illustrated, it should be noted that the same considerations are applicable to conductors of round cross section.

Turning now to FIGS. 6 and 7, there is shown an alternate coil configuration wherein the dielectric support 61 is replaced by a ferrite cup 90 adapted to further enhance coupling to the utensil. The ferrite cup provides a low permeability path for the magnetic field below the cooktop. The coil supporting surface may be grooved as in the previous embodiments or smoothly formed to accept an encapsulated coil, to be described below. The arrangement dispenses with the need for a highly conductive shield. The arrangement further illustrates an alternative spring biased mounting means wherein a pair of coil springs 91, 92 encircle respective mounting dowels 93, 94 fitted through suitable openings in a supporting channel 95 for biasing the coil arrangement against the underside of the cooktop. Also illustrated are perforations or ports 96 formed vertically in the ferrite cup and ridges or scallops 97 formed radially therein for allowing convective air flow to cool the coil. It is emphasized that in the arrangement illustrated in FIGS. 6 and 7, as well as the arrangements set forth above, sufficient cooling is achieved to dissipate the heat produced by the $I^2R$ losses in the coil. It should be apparent that this is due not only to the illustrated configurations which allow for convective air flow, but also to the coil geometry which minimizes coil losses.

It will now be apparent that what has been provided is a work coil for use in an induction cooking appliance which, although economically manufactured, provides superior performance in such appliance. The solid conductor, which may be of round or rectangular cross section, is wound in a loose spiral, the degree of looseness being established to achieve the desired inductance while balancing proximity effect losses against skin effect losses. A range of optimum geometrical configurations is set forth wherein the coil losses are minimized and coupling efficiency maximized. The coil is immune to high temperatures and is adequately cooled by convection, eliminating the need for mechanical cooling.

I claim as my invention:

1. In a solid state induction cooking appliance for producing heat in a metallic utensil by means of an ultrasonic frequency magnetic field, said appliance including a solid state inverter having a resonant circuit comprising a capacitor and an inductor, an improved work coil for generating the ultrasonic frequency magnetic field and coupling said field to the utensil comprising a solid single strand substantially round conductor, said conductor being wound in a single layer spiral to form a substantially flat coil, the winding pitch being related to the radial thickness of the conductor by a thickness to pitch ratio in the range between 0.3 and 0.9 said work coil being connected as the inductor in said inverter and having sufficient inductance for resonating with said capacitor at an ultrasonic frequency whereby resonant exchange of energy between said work coil and capacitor causes said work coil to generate said ultrasonic frequency magnetic field.

2. The work coil as set forth in claim 1 wherein the coil is wound to include a stepwise increase in pitch, with the turns at the center of the coil being more widely spaced than the remaining turns.

3. The work coil as set forth in claim 1 wherein the coil pitch is progressively decreased with increasing coil radius over at least a portion of said coil radius, with the thickness-to-pitch ratio at the outer diameter of the coil being at least twice the thickness-to-pitch ratio at the inner diameter of the coil.

4. The work coil as set forth in claim 1 wherein the radial thickness of the conductor is in the range between 0.040 and 0.130 inches.

5. The work coil as set forth in claim 1 wherein the outer diameter of the coil is between 5 and 9 inches, the coil having a central opening with a diameter between 0.5 and 4 inches.

6. The work coil as set forth in claim 1 wherein the coil is wound to have an unloaded inductance of at least 10 microhenries at the ultrasonic operating frequency of the appliance.

7. The work coil as set forth in claim 1 wherein said appliance includes a substantially non-metallic cooktop for supporting a metallic utensil over the work coil, said work coil further including support means underlying the coiled conductor for supporting the coil, said support means including means for maintaining the spacing between turns of said conductor, and biasing means urging the support means against the cooktop for mounting said conductive coil below the cooktop.

* * * * *